(12) United States Patent
Ricotta et al.

(10) Patent No.: US 6,271,829 B1
(45) Date of Patent: Aug. 7, 2001

(54) EDITING INTERFACE

(75) Inventors: James J. Ricotta, Weston; Lawrence A. Bodony, Lexington; Peter Fasciano, Natick, all of MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/608,744

(22) Filed: Jun. 30, 2000

Related U.S. Application Data

(63) Continuation of application No. 08/895,530, filed on Jul. 17, 1997, now Pat. No. 6,084,569, which is a continuation of application No. 08/215,131, filed on Mar. 18, 1994, now abandoned.

(51) Int. Cl.$^7$ ................................................ G09G 5/00
(52) U.S. Cl. ......................... 345/156; 345/173; 348/705; 386/83
(58) Field of Search ................. 345/156, 173, 345/185; 348/705, 561, 563, 565, 588, 722; 386/83

(56) References Cited

U.S. PATENT DOCUMENTS

| | | | |
|---|---|---|---|
| 3,721,757 | 3/1973 | Ettlinger | 178/6.6 |
| 4,040,098 | 8/1977 | Beeson et al. | 360/14 |
| 4,100,607 * | 7/1978 | Skinner | 364/900 |
| 4,195,317 * | 3/1980 | Stratton | 360/14 |
| 4,272,790 * | 6/1981 | Bates | 360/14 |
| 4,612,569 * | 9/1986 | Ichinose | 358/22 |
| 4,633,416 * | 12/1986 | Walker | 364/521 |
| 4,670,743 * | 6/1987 | Zemke | 340/709 |
| 4,698,664 * | 10/1987 | Nichols et al. | 358/10 |
| 4,866,542 * | 9/1989 | Shimada et al. | 360/10.3 |
| 4,873,584 * | 10/1989 | Hashimoto | 358/335 |
| 4,937,685 * | 6/1990 | Baker et al. | 360/14.1 |
| 4,954,967 * | 9/1990 | Takahashi | 345/173 |
| 4,954,969 * | 9/1990 | Tsumura | 364/521 |
| 4,964,004 * | 10/1990 | Baker | 364/14.1 |
| 4,979,050 * | 12/1990 | Westland | 360/14.1 |
| 4,988,982 * | 1/1991 | Rayner et al. | 340/706 |
| 5,077,610 | 12/1991 | Searby et al. | 358/183 |
| 5,109,482 | 4/1992 | Bohrman | 395/154 |
| 5,111,409 | 5/1992 | Gasper et al. | 395/152 |
| 5,121,470 | 6/1992 | Trautman | 395/140 |
| 5,148,154 | 9/1992 | MacKay et al. | 340/712 |
| 5,191,645 | 3/1993 | Carlucci et al. | 395/159 |
| 5,237,648 | 8/1993 | Mills et al. | 395/133 |
| 5,262,865 | 11/1993 | Herz | 358/181 |
| 5,289,566 | 2/1994 | Walker et al. | 395/132 |
| 5,307,456 | 4/1994 | Mackay | 395/154 |
| 5,499,221 | 3/1996 | Ito et al. | 358/342 |
| 5,598,527 | 1/1997 | Debrus et al. | 345/173 |
| 5,805,733 | 8/1998 | Wang et al. | 382/232 |

FOREIGN PATENT DOCUMENTS

| | | |
|---|---|---|
| 0 113 993 A2 | 7/1984 | (EP) . |
| 0133993 A2 * | 7/1984 | (EP) . |
| 0 390 048 A2 | 10/1990 | (EP) . |
| 0390048 A2 * | 10/1990 | (EP) . |
| 2 235 815 * | 3/1991 | (GB) . |
| WO 90/05350 * | 7/1984 | (WO) . |
| WO 90/05350 | 5/1990 | (WO) . |

OTHER PUBLICATIONS

"CMX 6000" (5-page product brochure), Mar. 1987.

(List continued on next page.)

Primary Examiner—Amare Mengistu
(74) Attorney, Agent, or Firm—Kristofer E. Elbing

(57) ABSTRACT

A media control apparatus that is sensitive to touch along a length of an actuation sensing area. User actuation at different positions is translated into events for use by an application to access different media recording elements, based on an association between the positions and the media recording elements.

30 Claims, 3 Drawing Sheets

OTHER PUBLICATIONS

"CMX 6000" (4–page product brochure), Mar. 1988.

"CMX 6000 Disk–Based Audio and Video Editing System," C. Hardman, International Broadcast Engineer, vol. 18, p. 37, Mar. 1987.

"The CMX 6000 Manual Supplement," Version 2.2, Michael Rubin, Jun. 1, 1989.

"Digital Nonlinear Editing," Thomas A. Ohanian, p. 319–20, Focal Press, 1993.

"The Evolution of DVI System Software"; James L. Green; Communications of the ACM; Jan. 1992; vol. 35, No. 1; pp. 53–67.

"Multimedia–Computer und die Zukunft des Film/Videoschnitts"; Peter Krieg; 8195 FKT Fernseh–und Kino–technik 45 (1991); No. 5; Heidelberg. DE; 3 pages.

"Video Tape Editing Systems," International Broadcast Engineer, vol. 19, No. 22, p. 44–46,48, Dec., 1988.

"Virtual Video Editing in Interactive Multimedia Applications"; Wendy E. Mackay et al.; Communications of the ACT; Jul. 1989; vol. 32, No. 7; pp. 802–810.

"A Window–Based Editor for Digital Video and Audio"; P. Venkat Rangan et al.; Abstract; 1992 IEEE; pp. 640–648.

* cited by examiner

EDITING INTERFACE

CROSS-REFERENCE TO RELATED APPLICATIONS

This application is a continuation of Ser. No. 08/895,530, Jul. 17, 1997, U.S. Pat. No. 6,084,569, which is a continuation of Ser. No. 08/215,131 filed on Mar. 18, 1994, is now abandoned.

FIELD OF THE INVENTION

This invention relates to controllers for editing sequences of stored media samples, such as video and audio material.

BACKGROUND OF THE INVENTION

Post-production video, film, and sound editors must frequently look for, and play back, portions of a sequence of recorded material, such as a digitized video or audio recording. They can do this by using well known button-type interfaces, which include a series of control buttons such as: "play", "stop", "fast-forward", and "rewind". These allow the editor to sequentially move through the recorded material and play it back. Jog knobs, shuttle knobs, levers, and sliders are also available for moving through the material sequentially in order to find and play a given sequence.

In PCT Publication No. WO 93/21595, published Oct. 28, 1993, entitled "MEDIA COMPOSER INCLUDING POINTER-BASED DISPLAY OF SEQUENTIALLY STORED SAMPLES," Eric C. Peters and Joseph H. Rice present a mouse-based method of accessing video material. In this interface, a user can use a mouse to move a cursor to a location within a time line displayed on a video screen. This time line represents a sequence of recorded material, such as one or more video sequences. By selecting a position in the time line, the editor can display the image corresponding to that position. This interface is currently used in the "Media Composer" editing system, which is available from Avid Technology, Inc., of Tewksbury, Mass.

The time line in this system can display a cursor in the time line to indicate the currently selected position. It can also associate a series of representative frames of the video material with the time line, to assist the editor in finding a desired location within the material. The use of this time line in transition editing operations is discussed in U.S. patent application Ser. No. 08/049,028, filed on Apr. 16, 1993, entitled "METHOD AND USER INTERFACE FOR CREATING, SPECIFYING AND ADJUSTING MOTION PICTURE TRANSITIONS", filed by Eric C. Peters, and Joseph H. Rice.

Digital audio editing operations have also been performed using a mouse-based time line approach. These types of operations are described in U.S. patent application Ser. No. 07/997,716, filed Dec. 31, 1992 and entitled "DISPLAY SYSTEM FACILITATING COMPUTER ASSISTED AUDIO EDITING", filed by Mark J. Norton. Further discussion of audio editing using time lines is presented in U.S. patent application Ser. No. 08/045,650, filed on Apr. 9, 1993, entitled "DIGITAL AUDIO WORKSTATION PROVIDING DIGITAL STORAGE AND DISPLAY OF VIDEO INFORMATION", filed by Peter J. Fasciano, et al.

A specialized mechanical user interface for video editing is presented in U.S. patent application Ser. No. 07/932,703, entitled "MECHANICAL USER INTERFACE", filed by Henry Sharpe III et al. This interface includes a slider which communicates with an Apple MacIntosh via the Apple Desktop Bus standard. The user can actuate the slider to play back video material at an adjustable rate, or frame-by-frame. The above applications are herein incorporated by reference.

SUMMARY OF THE INVENTION

Generally, the invention features associating media recording elements in a sequence with positions on a linear sensor, and presenting a corresponding one of the media recording elements to the user in response to the position of the users touch. In another general aspect, the invention features a media control apparatus which includes a linear actuator and a plurality of media storage areas ordered according to a time sequence. The linear actuator includes an actuation sensing area sensitive to user actuation at one of a plurality of positions along a length of the sensing area. The apparatus can be responsive to a position signal output of the linear actuator to access one of the media recording storage areas corresponding to a user-selected position. The apparatus can also include a linear display area mounted in parallel with the linear actuator.

This invention is advantageous in that it is easy to understand, even for editors who have never used a computer input device, such as a mouse. With this system, users can quickly access video and audio information with simple, intuitive hand movements. Users do not need to hunt for a mouse on a desk, nor do they need to look for a cursor on a computer screen and then move it to a control area. In some instances, the user may not even need to look at any control information on a computer screen, allowing him or her to concentrate on the actual material to be manipulated.

DETAILED DESCRIPTION

Figure 1:
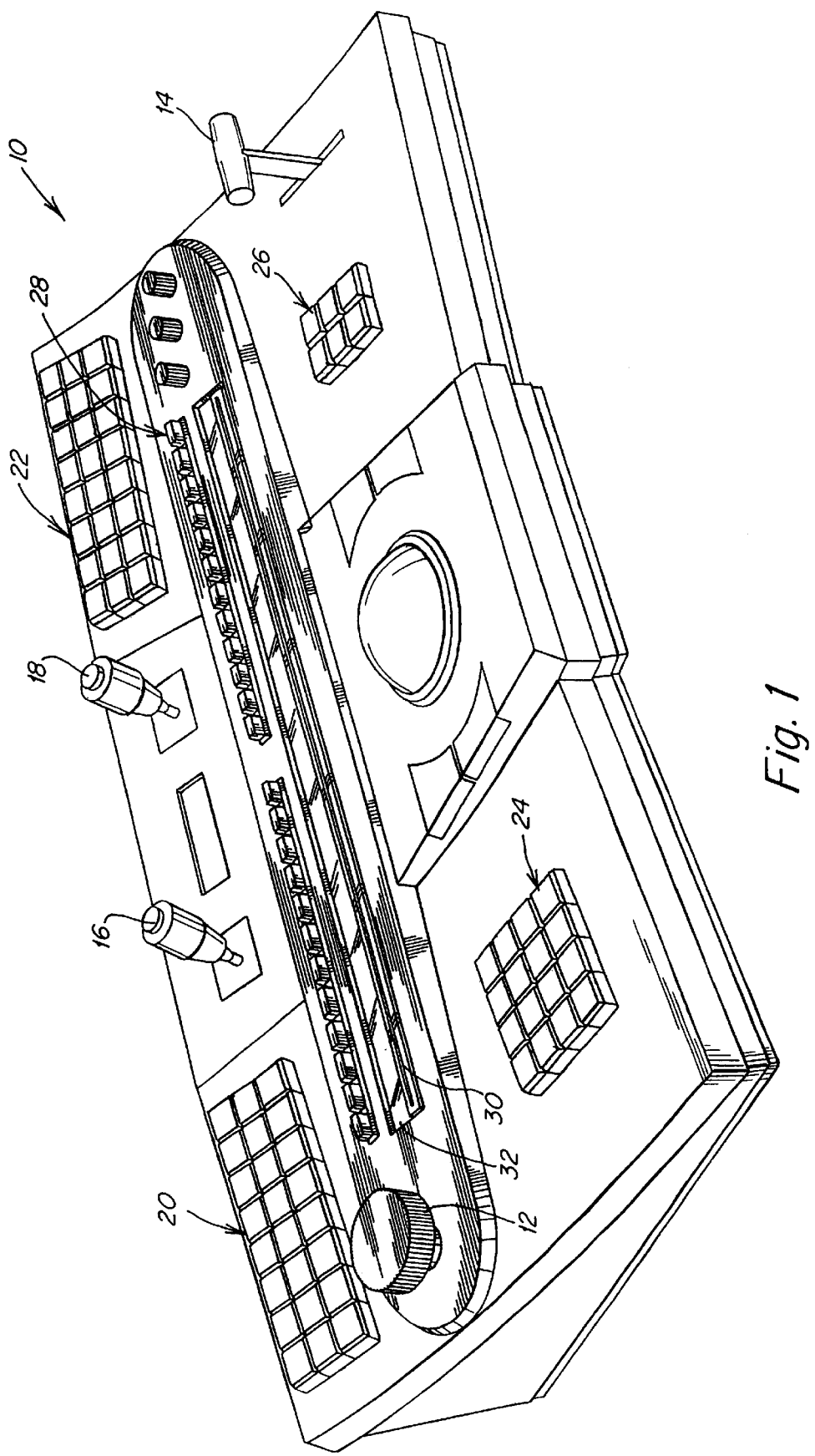
FIG. 1 is a perspective drawing of an editing control panel according to the invention.

Referring to FIG. 1, an editing control panel 10 includes a jog-shuttle wheel 12, a fader bar 14, an X–Y image size/perspective joy stick 16, and an X–Y position/skew joy stick 18. The panel also includes first, second, third, fourth, and fifth banks of assignable buttons 20, 22, 24, 26, 28, which may be defined by the user, or by system software. A linear touch bar 30 sits across the panel, parallel to and just below a three-line linear screen 32 with a built-in driver. The fifth bank of switches is aligned parallel to, and above, the LCD screen.

Figure 2:
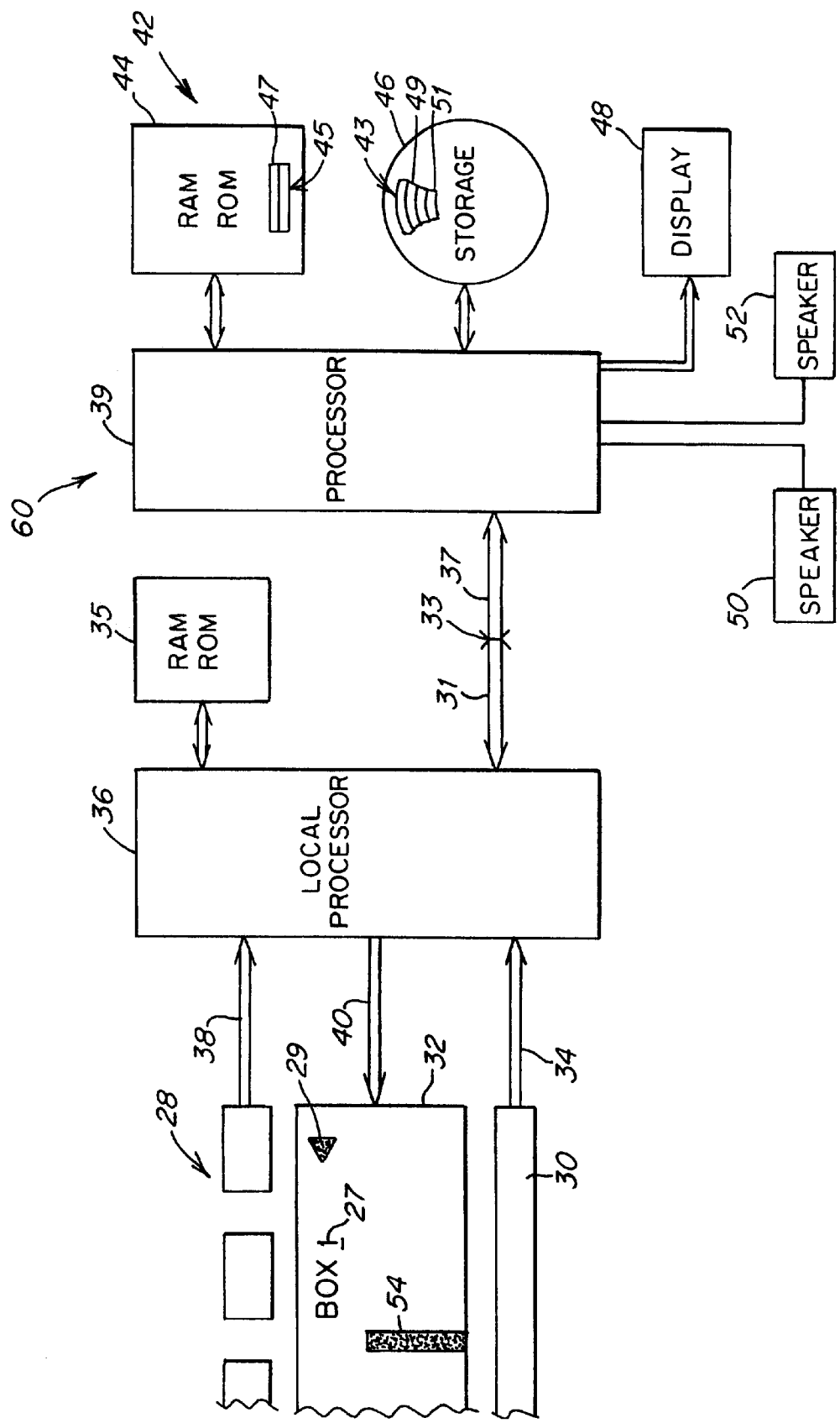
FIG. 2 is a block diagram of circuitry for use in connection with the editing control panel of FIG. 1.

Referring also to FIG. 2, the touch strip 30 can be a capacitive or resistive touch sensor with a built-in digital interface. This type of touch strip is commercially available and operates by sensing a capacitance or resistance change on the strip due to contact by the user's skin. Integral interface circuitry translates this capacitance change into a digital value, which indicates where the user touched the touch strip. The digital value generated by the touch strip may be provided on a bus 34 to a local processor 36 located within the control panel 10.

The microprocessor 36 is also responsive to the switches in the fifth bank 28 via another bus 38, and it provides display information to the display 32 via output lines 40. Similar connections supply signals from the jog-shuttle wheel 12, the fader bar 14, the two joy sticks 16, 18, and the first, second, third, and fourth banks of assignable buttons 20, 22, 24, 26. As is well known, the processor is associated with storage 35, such as semiconductor memory storage.

The processor has bidirectional input-output (IO) lines 31, which lead to a connector 33 on the rear of the housing of the control panel 10. These lines and connector are configurable according to any of a number of serial or parallel interface standards, such as the well-known Apple Desktop Bus (ADB) standard, which is a bidirectional serial bus used to connect keyboards, mice, and other peripheral devices to Apple personal computers. This connector can therefore be connected to an Apple MacIntosh personal computer 60 via a cable 37. The personal computer 60 includes a processor 39, which is associated with storage 42, such as semiconductor storage 44, and disk storage 46. A display 48, and speakers 50, 52 are also responsive to the processor.

The storage 42 of the computer holds various stored digital sequences 43, 45. These can include code sequences, such as the computer's operating system, applications, and drivers. They can also include recording data, such as a series of digitized images. These can be stored in a series of storage areas 49 indexed by indexing information stored in further storage areas 51.

Preferably, one of the applications run by the computer is the "Media Composer" application 53 referenced above. Also stored in the computer should be a control panel device driver 47, which interfaces the signals received from the control panel via the serial interface to the "Media Composer" application as described below.

Figure 3:
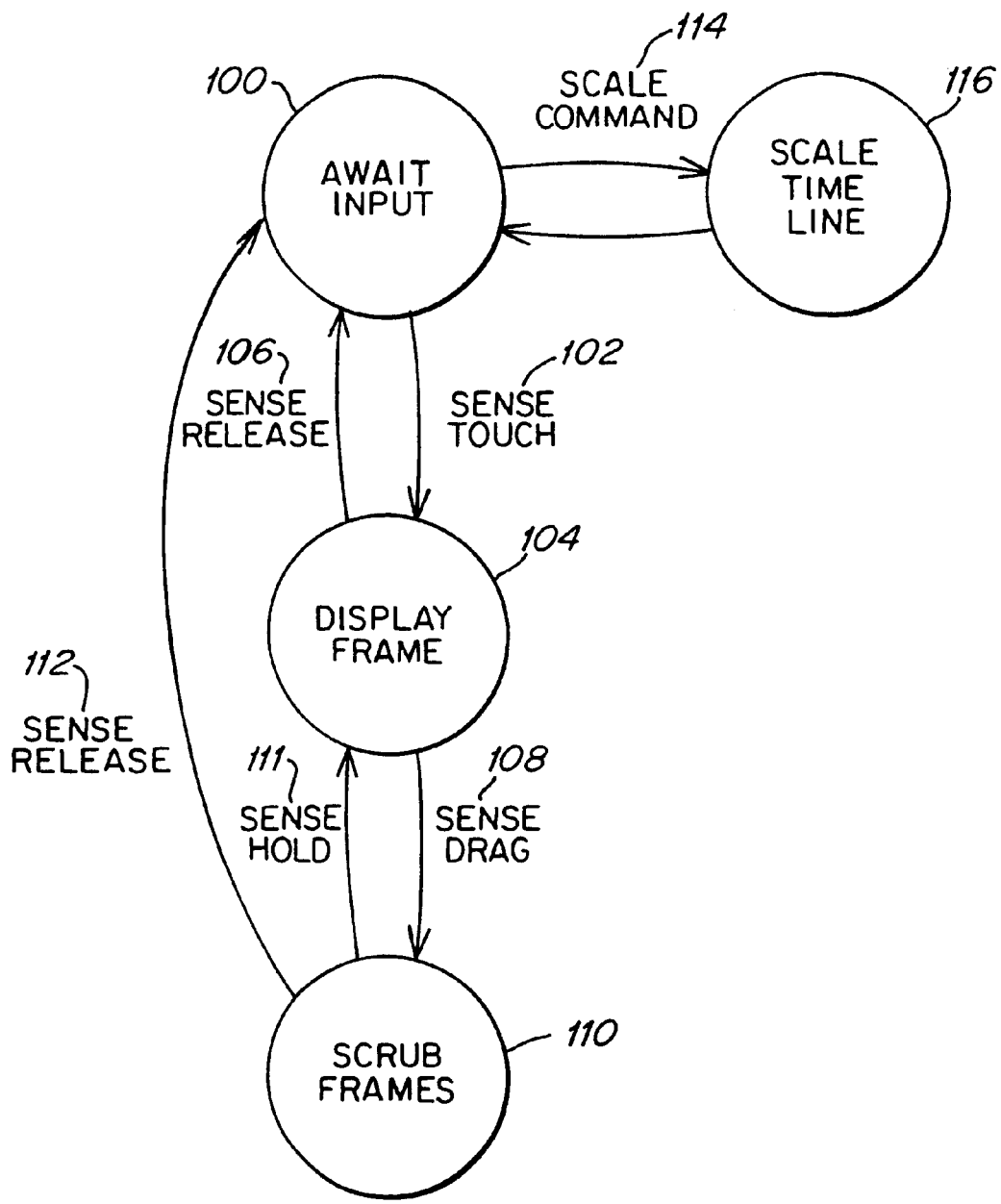
FIG. 3 is a state diagram illustrating operations using the editing control panel of FIG. 1.

In operation, referring to FIGS. 1–3, the control panel 10 enters an awaiting input state 100. When the user touches a point on the touch strip 30, it provides the microprocessor 36 with an indication that this contact has occurred, along with a value indicating where it occurred, via the bus 34 (step 102). The microprocessor receives this command, translates it to an event code, and forwards it to the personal computer via the serial interface. The microprocessor time-multiplexes this event code with other signals from the other controls, such as the switches and joysticks.

The personal computer's processor 47 receives the touch command event code, and uses the driver 47 to translate it into a signal, which the computer's operating system interprets as mouse input event. Specifically, in the case of a user touching a point on the touch strip, the command is translated into an indication that the user had pressed the mouse button while the cursor was at a corresponding point on the time line displayed in the application. For example, touching the touch strip 30 at its central point will be translated into an indication that the user had "single-clicked" with the mouse at the central point of the time line.

In response to this translated event, the application causes the processor to use the indexing information 51 to retrieve a frame corresponding to the touched position from the stored video material, and display it on the display 48. In retrieving this frame, the processor accesses information indicating what the desired scale for the time line and touch strip is. For example, if a ten minute digitized video sequence is stored in the disk storage 46, and the touch bar reports a value indicating that the user has touched it at it's center, the processor will retrieve and display the central frame in that sequence, i.e., the frame at the five minute mark.

If the user lifts his or her finger from the touch strip 30 (step 106), the touch strip reports this to the microprocessor 36, which translates and relays it to the computer's processor 39. The driver 47 presents this command to the processor as a release of a mouse button, and the application leaves the frame displayed on the display 48.

If instead of lifting his or her finger, the user slides it along the touch strip 30 in a forward or reverse direction, the touch strip will provide continuous updated position values to the microprocessor 36 (step 108). The microprocessor and driver translate these values into updated mouse positions, with the mouse button being pressed. The processor will respond to this sliding motion by successively displaying the frames before or after the initially displayed frame. These are displayed at the same rate at which the user drags his or her finger, and this is known as a "scrub" mode. The driver or microprocessor procedures may have to perform non-linear translations in order to achieve a pleasing playback response. Sampled audio information may also be retrieved from the storage by the processor and played through one or more speakers 50, 52. This audio information may be played in synchrony with the displayed video information, or it may be played alone.

When the user then lifts his or her finger from the touch strip 30, it reports this to the microprocessor 36 (step 112). The control panel then returns to the awaiting input state 100, and the application leaves the currently displayed frame on the display, as described above. If, instead of lifting his or her finger (step 112), he or she stops dragging it (step 111), the scrub mode will also stop with the current frame displayed (step 104). Lifting his or her finger (step 106), will then again return the control panel to the awaiting input state 100.

A cursor 54 is displayed in the screen 32, under control of the microprocessor 36. The position of this cursor is in alignment with the last finger position reported to the microprocessor by the touch strip. It remains aligned with this last position even after the user's finger has been lifted from the touch strip 30.

Different scales can be used for the touch strip 30. The user can make adjustments to this scale by providing a scale command (step 114) to the application running on the computer processor 39. This scale command can be provided to the processor through the computer's keyboard, its mouse, or through a button on the control panel assigned to this function. Actuation of the assigned button is detected by the microprocessor 36, which translates it into an event code that is sent to the computer 60.

In the computer 60, the driver 47 translates the received scale code into an application input event. The application responds to this event by redefining the correspondence between the touch strip and the sequence of stored material. This can be done by updating the indexing material to assign new points in the stored material to correspond to the ends of the time line. In this way, the user may "zoom" in or out in the material, or he or she may switch from working on one set of images to the next.

It is noted that the screen 32 has three lines, with the two bottom lines devoted to the cursor 54, The top line of the LCD screen can be used for displaying button label codes 27, 29. The computer 37 downloads these to the microprocessor 36, which translates them and provides them to the screen. A larger LCD screen could also be used, and representative frames of the stored material could be displayed along the touch strip in a similar way.

The above embodiment presents a control panel peripheral for use on the Apple Desktop bus with a driver routine stored in an Apple MacIntosh computer. The system could also be implemented with other types of computers, and other types of interfaces, such as IBM-PC parallel, IBM-PC serial, and SCSI interfaces. Analog recording or computer graphics recordings could also be displayed. Driver and microprocessor functionality could be implemented in the form of dedicated logic circuitry, and other hardware/software tradeoffs are also possible. Instead of being touch sensitive, the touch bar could also be a pressure sensitive bar, or another type of linear, absolute and random access control. With a pressure sensitive bar, an additional dimension of control is available. For example, the pressure with which the user presses upon the strip could be mapped to display brightness, audio volume, or the like. Furthermore, although it is preferable to use a straight, linear touch strip, such a linear touch strip could include some amount of curvature.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto.

What is claimed is:

1. A media control apparatus, comprising:
    a touch sensitive actuation sensing area sensitive to user actuation by touching the actuation sensing area at one of a plurality of positions along a length of the actuation sensing area, and including a position signal output,
    logic responsive to the position signal output of the actuation sensing area, wherein the logic is operative to translate user actuation at a first user-selected one of the positions into a translated event for use by an application to access a first one of a plurality of media recording elements that corresponds to the first position based on an association between the plurality of positions and the plurality of media recording elements, and to translate user actuation at a second user-selected one of the positions into a translated event for use by an application to access a second one of the plurality of media recording elements that corresponds to the second position based on the same association between the plurality of positions and the plurality of media recording elements.

2. The apparatus of claim 1 further including a linear display area mounted in parallel with the actuation sensing area.

3. The apparatus of claim 2 further including means responsive to the position signal output of the linear actuation sensing area and for displaying a cursor in the linear display area corresponding to the first and second positions.

4. The apparatus of claim 2 further including a series of buttons aligned in parallel with the linear display area, and wherein the means for displaying a cursor further includes means for displaying button labels proximate the buttons on the linear display area.

5. The apparatus of claim 1 further including means to provide an additional dimension of control to the actuation sensing area.

6. The apparatus of claim 1 further including means for reporting a user actuation position on the actuation sensing area.

7. The apparatus of claim 6 wherein the means for reporting a user actuation position on the actuation sensing area include a linear display area mounted with respect to the housing.

8. The apparatus of claim 6 wherein the means for reporting a user actuation position on the actuation sensing area include a time line.

9. The apparatus of claim 1 further including a video display responsive to the media storage elements and to the logic, and operative to display the media storage elements as video frames.

10. The apparatus of claim 9 further including an audio output device responsive to the media storage elements and to the logic, and operative to play the media storage elements as sound.

11. The apparatus of claim 1 further including an audio output device responsive to the media storage elements and to the logic, and operative to play the media storage elements as sound.

12. The apparatus of claim 1 wherein the media control apparatus is operatively connected to a media editing system and further including a pointing device operatively connected to the media editing system.

13. The apparatus of claim 1 wherein the actuation sensing area is part of a linear sensor.

14. The apparatus of claim 1 further including random-access storage for the media recording elements.

15. The apparatus of claim 14 wherein the storage includes a disk drive.

16. A media control apparatus, comprising:
    a touch sensitive actuation sensing area sensitive to user actuation by touching the actuation sensing area at one of a plurality of positions along a length of the actuation sensing area, and including a position signal output,
    logic responsive to the position signal output of the actuation sensing area to translate user actuation at user-selected ones of the positions into translated events for use by an application to access ones of a plurality of media recording elements ordered according to a time sequence such that the accessed media recording elements correspond to the user-selected ones of the positions,
    a linear display area mounted in parallel with the actuation sensing area, and
    logic responsive to the position signal output of the actuation sensing area and for displaying in the linear display area a cursor corresponding to the user-selected ones of the plurality of positions.

17. The apparatus of claim 16 further including a series of buttons mounted in parallel with the linear display area, and further including means for displaying button labels proximate the buttons on the linear display area.

18. The apparatus of claim 16 wherein the media control apparatus is operatively connected to a media editing system and further including a pointing device operatively connected to the media editing system.

19. The apparatus of claim 16 further including means to provide an additional dimension of control to the actuator.

20. The apparatus of claim 16 further including a video display responsive to the media recording elements and to the logic, and operative to display the media storage elements as video frames.

21. The apparatus of claim 20 further including an audio output device responsive to the media recording elements and to the logic, and operative to play the media recording elements as sound.

22. The apparatus of claim 16 further including an audio output device responsive to the media recording elements and to the logic, and operative to play the media recording elements as sound.

23. The apparatus of claim 16 further including random-access storage for the media recording elements.

24. The apparatus of claim 23 wherein the storage includes a disk drive.

25. A media control panel, comprising:

means for sensing user actuation by touching the actuation sensing area at one of a plurality of positions along a sensing area, means responsive to the means for sensing to translate user actuation at user-selected ones of the positions into translated events for use by an application to access ones of a plurality of media recording elements ordered according to a time sequence such that the accessed media recording elements correspond to the user-selected ones of the positions, linear means for displaying mounted in parallel with the means for sensing, and means responsive to the means for sensing and for displaying in the linear means a cursor corresponding to the one of the plurality of positions.

26. The apparatus of claim 25 further including a video display responsive to the media recording elements and operative to display the media storage elements as video frames.

27. The apparatus of claim 26 further including an audio output device responsive to the media recording elements and operative to play the media recording elements as sound.

28. The apparatus of claim 25 further including an audio output device responsive to the media recording elements and operative to play the media recording elements as sound.

29. The apparatus of claim 25 further including random-access storage for the media recording elements.

30. The apparatus of claim 29 wherein the storage includes a disk drive.

\* \* \* \* \*